United States Patent [19]

Neill, Jr. et al.

[11] 4,397,607
[45] Aug. 9, 1983

[54] METHOD OF CARRYING A WHEELCHAIR

[76] Inventors: Authur H. Neill, Jr., 12408 Keynote La., Bowie, Md. 20715; John A. Hinch, 9127 5th St., Lanham, Md. 20801

[21] Appl. No.: 341,732
[22] Filed: Jan. 22, 1982
[51] Int. Cl.³ .............................................. B60R 9/06
[52] U.S. Cl. ................................. 414/786; 224/310; 280/401; 280/402; 414/462; 414/921
[58] Field of Search .............. 414/462, 427, 467, 538, 414/540, 541, 559, 563, 786, 921; 280/401, 402; 224/310

[56] References Cited
U.S. PATENT DOCUMENTS

| 1,914,098 | 6/1933 | Bean | 414/538 |
| 2,233,697 | 3/1941 | Freitag | 280/401 |
| 4,127,200 | 11/1978 | Mann | 414/462 X |
| 4,191,316 | 3/1980 | Baumgartner | 414/462 X |
| 4,212,581 | 7/1980 | Pierce | 414/559 X |
| 4,297,069 | 10/1981 | Worthington | 414/462 |

Primary Examiner—Leslie J. Paperner
Attorney, Agent, or Firm—Otto M. Wildensteiner; Harold P. Deeley, Jr.

[57] ABSTRACT

A method of carrying a wheelchair externally of a vehicle without first folding the wheelchair. The wheelchair is placed so that its rear wheels rest against the rear of the vehicle; it is then lifted by a bumper-attached carrier, and the rear wheels roll up the rear bumper of the vehicle.

8 Claims, 3 Drawing Figures

METHOD OF CARRYING A WHEELCHAIR

STATEMENT OF GOVERNMENT INTEREST

The present invention may be made or used by or on behalf of the government of the United States for governmental purposes without the payment of any royalties thereon or therefore.

BACKGROUND

The present invention is a method of carrying a powered wheelchair on an automobile. Powered wheelchairs have greatly increased the mobility of handicapped persons, but they impose their own limits on this mobility. A handicapped person in a powered wheelchair is usually precluded from travelling by car because it has been, up to this point, difficult or impossible to carry the wheelchair in or on the car.

Prior art wheelchair carriers that are fixed to the rear bumper of the car require that the wheelchair be folded flat before being placed on the carrier. A powered folding wheelchair can be carried on one of these carriers, but the battery has to be removed first. If the user is mobile enough to remove the battery and fold up the chair, he probably does not need the wheelchair in the first place. If the user is able to drive a specially modified car but is not able to remove the battery and fold up the chair, then he must have a helper at each end of the trip to help him load and unload the wheelchair.

There is a large number of powered wheelchair users who are able to drive a car and who can walk a limited distance with a crutch or cane, but who find it difficult or impossible to complete a trip with their wheelchair. A specially equipped van with a wheelchair lift is a solution, but a very expensive one. The present invention allows these people to travel by car with their wheelchairs carried on the car, without requiring any assistance with the wheelchair. Likewise, it enables non-powered wheelchair users to avail themselves of the added benefits of powered wheelchairs by switching to powered chairs.

OBJECTS OF THE INVENTION

Accordingly, it is an object of the present invention to provide a method of carrying a wheelchair on an automobile.

It is a further object to provide such a method wherein the wheelchair does not need to be folded up.

It is a further object to provide such a method which will work with a powered or unpowered wheelchair.

It is a further object to provide such a method which can be practiced by a handicapped person having a limited amount of mobility outside of the wheelchair.

SUMMARY

Briefly, the present method uses a wheelchair carrier similar to prior art carriers; however, the centerline of the wheelchair is perpendicular to the vehicle's bumper rather than parallel to it as in the prior art. The two rear wheels of the chair are placed against the bumper, a winch-operated cable is attached to the chair, and the chair is lifted up onto the carrier. As the chair is lifted the rear wheels roll up the bumper to the intersection formed by the rear of the trunk lid; and the top of the bumper the chair is supported by the cable, and is secured to the carrier by another cable or other means to keep it from swinging while the car is moving.

DESCRIPTION OF THE PREFERRED EMBODIMENT

Figure 1:
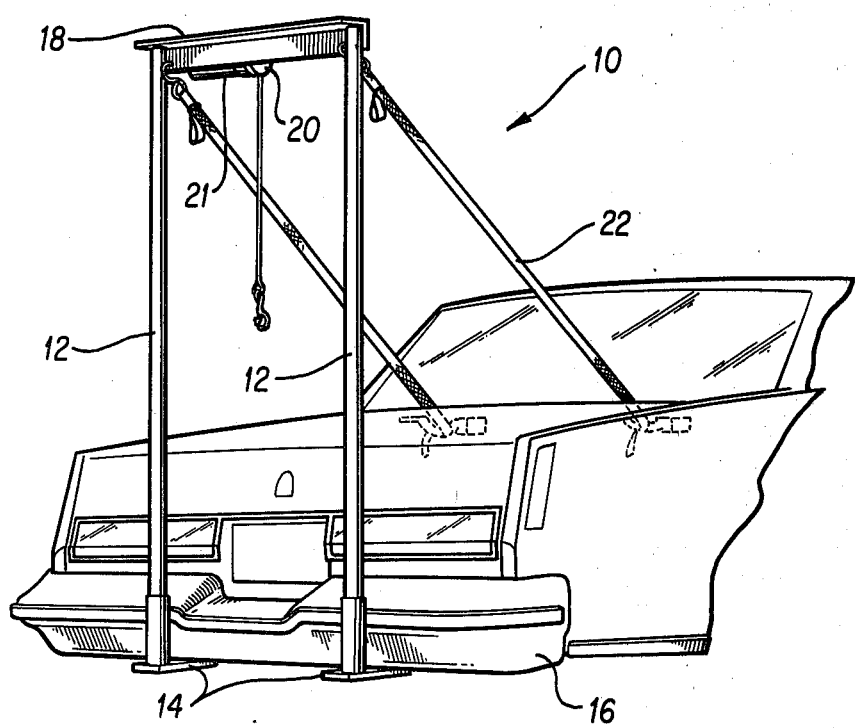
FIG. 1 shows the wheelchair carrier of the present invention attached to a car.

FIG. 1 shows the wheelchair carrier 10 of the present invention attached to a car or other vehicle. It comprises two vertical members 12 that are attached to brackets 14 which are bolted or otherwise fixed as is well known in the art to bumper 16 of the vehicle. At the top of vertical members 12 is a horizontal member 18 which has a winch or other lifting device 20 attached to it. Vertical members 12, brackets 14, and horizontal member 18 can be made of any material but must be of sufficient size and strength to support a motorized wheelchair (which weighs approximately 250 pounds). Likewise, winch 20 must be capable of lifting this weight.

Stabilizing straps 22 attached to horizontal member 18 hook onto the front of the trunk lid of the vehicle; these straps keep vertical members 12 from being bent backward by the weight of the wheelchair.

Winch 20 can be of any size, so long as it is able to lift the weight of the wheelchair and hold it in the raised position (see FIG. 3) while the vehicle is moving. Electric motor 21 which powers winch 20 is a 12 volts DC motor operated by the vehicle's electrical system; alternatively, however, it could be operated by the wheelchair's electrical system. A suitable winch and motor assembly is a model 6x190 made by W. W. Grainger, Inc., 5959 W. Howard St., Chicago, Ill. 60648. The control for the winch is a reversing toggle switch (not shown) mounted on one of vertical members 12; to raise the chair the switch is flipped up, to lower it the switch is flipped down.

Winch 20 is preferably placed on the front side of hoizontal member 18 so that when the chair is in place there is a slight forward pull in the cable; this forward pull helps to keep the chair firmly against the vehicle so that it doesn't swing or bounce.

Winch 20 is preferably motorized, since this is obviously easier for a handicapped person to operate. However, it could also be operated manually where this is feasible in light of the handicapped person's condition; a manually operated winch would obviously be lighter and cheaper than a motorized winch.

The wheelchair is lifted and carried by means of a pair of aircraft cable loops 24 and 26 that are fastened to the chair frame by rope clips. Loop 24 goes between the inner portion of the rear axle housing and the battery pack and extends up each side of the back of the chair; loop 26 is tied to the frame at the front vertical struts, passes under the wheelchair's arms, and meets the first loop just above the back of the chair. Together the two loops form a bridle which allows the chair to be lifted and suspended from a single point.

Figure 2:
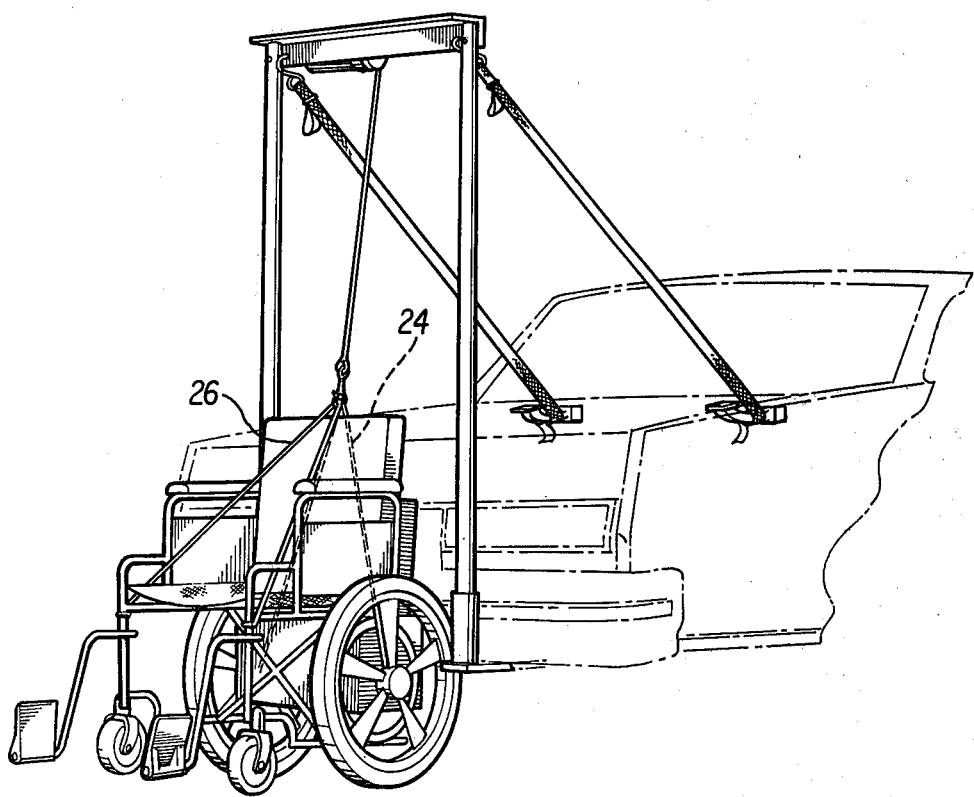
FIG. 2 shows a wheechair in place ready to be lifted onto the carrier.
Figure 3:
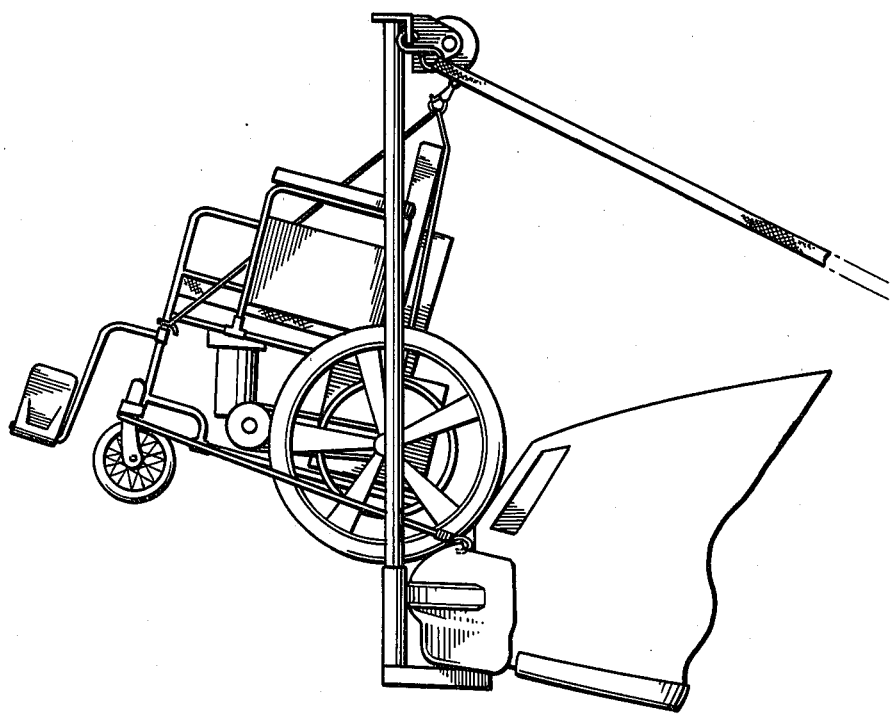
FIG. 3 shows a wheelchair secured on the carrier.

In operation, the chair is backed up against the rear bumper of the vehicle between vertical members 12 as shown n FIG. 2. The two cable loops are put in the hook in the end of the winch cable, and the winch is energized. As the chair is raised the rear wheels roll up the rear bumper of the vehicle; when the wheels reach the top of the bumper as shown in FIG. 3 the winch is stopped. At this point most of the weight of the chair is carried by the winch, but a small part of it is carried by the bumper; this plus the forward component of force in the cable keeps the chair secured in place for short trips on smooth roads. For longer trips or bumpy roads a strap or length of bungee cord (not shown) can be used to lash the chair securely to the vehicle.

While the bumper-attached carrier has been shown as comprising two vertical members and a horizontal cross-member, any other form of carrier can also be used. The only requirement is that the lifting cable have a force in it that is primarily vertical with a forward component, so that the wheelchair rolls up the rear of the vehicle and is then held up and held against the vehicle by the lifting cable.

What is claimed is:

1. The method of carrying a wheelchair on a vehicle, the vehicle having affixed to its rear bumper a carrier of the type comprising two vertical upright members and a horizontal cross-member and having a lifting device on its horizontal member, which comprises:
   a. affixing one end of a cable to said lifting device;
   b. positioning said wheelchair with its back facing the rear of said vehicle and its rear wheels touching said rear bumper;
   c. affixing the other end of said cable to said wheelchair; and
   d. raising said wheelchair off the ground by means of said lifting device, said rear wheels of said wheelchair rolling up the rear bumper of said vehicle.

2. The method of claim 1 further including fastening said wheelchair to said vehicle after it has been raised by a second means to prevent swinging.

3. The method of claim 2 wherein said lifting device is a winch.

4. The method of claim 3 wherein said winch is on the front side of said horizontal cross-member.

5. The method of claim 4 wherein said winch is electrically operated.

6. The method of claim 5 wherein said winch is operated by the vehicle's electrical system.

7. The method of claim 5 wherein said wheelchair is electrically operated.

8. The method of claim 7 wherein said winch is operated by the wheelchair's electrical system.

* * * * *